United States Patent
Rover et al.

(10) Patent No.: US 7,383,340 B2
(45) Date of Patent: Jun. 3, 2008

(54) SYSTEM AND METHOD FOR PROGRAMMATICALLY CHANGING THE NETWORK LOCATION OF A NETWORK COMPONENT

(75) Inventors: Jeremy L. Rover, Beaverton, OR (US); Amber D. Sistla, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 779 days.

(21) Appl. No.: 10/611,787

(22) Filed: Jun. 30, 2003

(65) Prior Publication Data

US 2004/0267923 A1 Dec. 30, 2004

(51) Int. Cl.
*G06F 15/16* (2006.01)
(52) U.S. Cl. .................... 709/227; 709/223; 709/224; 709/228
(58) Field of Classification Search ................ 709/223, 709/224, 227, 228
See application file for complete search history.

(56) References Cited

U.S. PATENT DOCUMENTS

| | | | |
|---|---|---|---|
| 5,751,967 A | 5/1998 | Raab et al. | |
| 5,964,837 A * | 10/1999 | Chao et al. | 709/224 |
| 6,047,330 A * | 4/2000 | Stracke, Jr. | 709/238 |
| 6,061,334 A | 5/2000 | Berlovitch et al. | |
| 6,075,776 A * | 6/2000 | Tanimoto et al. | 370/254 |
| 6,131,119 A | 10/2000 | Fukui | |
| 6,173,411 B1 * | 1/2001 | Hirst et al. | 714/4 |
| 6,349,306 B1 | 2/2002 | Malik et al. | |
| 6,404,741 B1 | 6/2002 | Buhler et al. | |
| 6,499,115 B1 * | 12/2002 | Wiedeman et al. | 714/30 |
| 6,651,093 B1 * | 11/2003 | Wiedeman et al. | 709/221 |
| 6,658,469 B1 * | 12/2003 | Massa et al. | 709/224 |
| 6,697,360 B1 | 2/2004 | Gai et al. | |
| 6,732,176 B1 * | 5/2004 | Stewart et al. | 709/227 |
| 6,741,592 B1 * | 5/2004 | Edsall et al. | 370/389 |
| 7,069,320 B1 * | 6/2006 | Chang et al. | 709/225 |
| 7,088,674 B2 * | 8/2006 | MacKiewich et al. | 370/225 |
| 7,092,943 B2 * | 8/2006 | Roese et al. | 707/9 |
| 2002/0065919 A1 * | 5/2002 | Taylor et al. | 709/226 |
| 2002/0149601 A1 | 10/2002 | Rajarajan et al. | |
| 2002/0161867 A1 | 10/2002 | Cochran et al. | |
| 2003/0069960 A1 * | 4/2003 | Symons et al. | 709/224 |

(Continued)

FOREIGN PATENT DOCUMENTS

GB 2 365 252 A 2/2002

(Continued)

OTHER PUBLICATIONS

Application No. PCT/US2004/021086 Int'l Preliminary Report on Patentability, Chapter 1, dated Jan. 12, 2006.

(Continued)

*Primary Examiner*—Liang-che Alex Wang
(74) *Attorney, Agent, or Firm*—Philip A. Pedigo

(57) ABSTRACT

A system and method for programmatically changing the network location of a network component is disclosed. A network management layer programmatically interrupts a link between the network component and the network. The network management layer then changes the network to which the network component is linked. The link between the network component and the changed network is programmatically established or reestablished.

27 Claims, 11 Drawing Sheets

U.S. PATENT DOCUMENTS

| | | | |
|---|---|---|---|
| 2003/0120955 A1 | 6/2003 | Bartal et al. | |
| 2003/0212781 A1* | 11/2003 | Kaneda et al. | 709/223 |
| 2003/0217148 A1* | 11/2003 | Mullen et al. | 709/225 |
| 2004/0059813 A1* | 3/2004 | Bolder et al. | 709/224 |
| 2004/0093400 A1 | 5/2004 | Richard et al. | |

FOREIGN PATENT DOCUMENTS

| | | |
|---|---|---|
| WO | WO 97/29605 | 8/1997 |
| WO | WO 00/74303 A2 | 12/2002 |
| WO | WO 03/048933 A1 | 6/2003 |

OTHER PUBLICATIONS

Chien-Chung Shen: The Network as Distributed Object Database; 1998 IEEE; XP-000799525; pp. 540-548.

AutoInstall Using DHCP for LAN Interfaces; Cisco IOS Release 12.1(5)T; XP-002210269; pp. 1-12.

Routhier: Management Information Base for the Internet Protocol (IP); draft-ietf-ipv6-rfc2011-update-10.txt; 144 pages.

Herur et al: Management of Databases Using SNMP: A Framework for a Unified Database MIB; 1998 IEEE; pp. 29-32.

In'l App. No. PCT/US2004/019698; PCT Search Report & Written Opinion dated Oct. 18, 2004.

In'l App. No. PCT/US2004/019699; PCT Search Report & Written Opinion dated Oct. 21, 2004.

In'l App. No. PCT/US2004/019614; PCT Search Report & Written Opinion dated Nov. 15, 2004.

In'l App. No. PCT/US2004/021086; PCT Search Report & Written Opinion dated Oct. 21, 2004.

In'l App. No. PCT/US2004/019698; Int'l Preliminary Report on Patentability Chapter 1 dated Dec. 12, 2006.

In'l App. No. PCT/US2004/019699; Int'l Preliminary Report on Patentability Chapter 1 dated Dec. 12, 2006.

In'l App. No. PCT/US2004/019615; Int'l Preliminary Report on Patentability Chapter 1 dated Dec. 12, 2006.

In'l App. No. PCT/US2004/019614; Int'l Preliminary Report on Patentability Chapter 1 dated Dec. 12, 2006.

Office Action mailed Feb. 9, 2007 for corresponding U.S. Appl. No. 10/611,951, filed Jun. 30, 2003, to Rover et al.

Office Action mailed Jun. 4, 2007 for corresponding U.S. Appl. No. 10/610,989, filed Jun. 30, 2003, to Rover et al.

"Management Information Base for the Internet Protocol (IP)", draft-ietf-ipv6-rfc2011-update-02.txt, Mar. 22, 2007, 98 pages.

V. Herur et al., "Management of Databases using SNMP: A Framework for a Unified Database MIB", University of Western Sydney, Nepean Australia, 4 pages.

* cited by examiner

302 — [Dynamic Network Devic s]

{ ## DeviceName    OS(WIN2K|WINXP_PRO)
  ## MAC_Address   Subnet_suffix Card_type 304 — [Non-Dynamic Network Devices]

StaticDevName IPAddr1 ... IPAddrN

306 — [Power Management Devices]

HomeAddress (A-P)
DeviceCode (1-16)  AssociatedDevice

308 — [Hubs]

HubName
AssociatedDevicesName

210 — [VLAN Configuration]

switchName switchIp switchPassword controlPort
Port Num (list of ports)
AssociatedDevice (list of devices)

312 — [Routers]

{ ## routerName     password controlIP
  ## interfaceType interface suffix

214 — [DHCP Servers]

dhcpServerName password controlInterface controlAddress subnet
interface ipSuffix subnetMask routerSuffix 316 — [Addressing Scheme]

prefixType prefix

605
⎯ SubnetGroupingType(internal, external)
615 ⎯ SubnetSubsection1
　　　Topology Type 1 (802.11a, 802.11b, etc)
　　　...
　　　Topology Type N (802.11a, 802.11b, etc)
　　...
　　SubnetSubsectionN
　　　Topology Type 1 (802.11a, 802.11b, etc)
　　　...
　　　Topology Type N (802.11a, 802.11b, etc)
610
⎯ DeviceSection
　　"n" DeviceTypes StartLocation

SYSTEM AND METHOD FOR PROGRAMMATICALLY CHANGING THE NETWORK LOCATION OF A NETWORK COMPONENT

RELATED APPLICATIONS

This nonprovisional patent application is related to the following contemporaneously filed nonprovisional patent applications: U.S. patent application Ser. No. 10/610,989, entitled, "System and Method for Dynamically Configuring and Transitioning Wired and Wireless Networks;" U.S. patent application Ser. No. 10/611,596, entitled "System and Method for Describing Network Resource Availability and Associations;" U.S. patent application Ser. No. 10/611,591, entitled "System and Method for Synchronous Configuration of Dynamic Host Configuration Protocol (DHCP) Server and Router Interfaces"; and U.S. patent application Ser. No. 10/611,786, entitled "System and Method for the Design and Description of Networks."

TECHNICAL FIELD

Embodiments of the invention generally relate to the field of networks and, more particularly, to a system and method for programmatically changing the network location of a network component.

BACKGROUND

Mobile networking technologies are driving an evolution in the use and structure of networks. For example, users of mobile networking technologies expect to stay connected as they move from place to place and from network to network. Furthermore, users of mobile networking technologies expect easy and seamless network interface transitions as they move from place to place.

The term network component broadly refers to a node (e.g., a desktop, laptop, etc.) or a collection of nodes (e.g., a virtual private network, a subnet, a virtual local area network, etc.). The term node refers to a network component having a network interface. Examples of a node include switches, routers, servers, clients, workstations, laptops, handhelds, printers, hubs, and the like.

The movement of network components from place to place and network to network fosters constantly changing network infrastructures and topologies. Network components are typically configured to interact with particular network infrastructures and topologies. The term configuration can be used with respect to a network component or to an entire network. When used in association with a network component, configuration refers to the settings of software, hardware, and firmware that enable the network component to exchange information with a network. In a broader sense, configuring a network refers to configuring a plurality of network components to exchange information with one other.

Modem networking technologies increase the variety of network components that interact with a network and, also, the frequency at which these interactions occur. These interactions produce a combinational explosion of heterogeneous networks composed of many different network components each having a distinct configuration. This combinational explosion of heterogeneous networks is further complicated by the possibility that an initial network configuration changes over time as network components are added and removed from the network.

The term network location broadly refers to, for example, the subnet, Virtual Local Area Network (VLAN), and/or link with which a network component is associated. Changing network location refers to changing the subnet, VLAN, and/or link with which a network component is associated. A link is a physical or logical connection between a network component and an associated network. A link may be wired (e.g., a cable connecting a network component to a local area network (LAN)) or it may be wireless (e.g., an electromagnetic signal connecting a network component to a wireless LAN, and/or a General Packet Radio Service network, and/or a Global System for Mobile Communications network, or a Wireless Wide Area Network). The General System for Mobile Communications (GSM) refers, for example, to the GSM 8.08 V9.0.0 (2000-7) standard entitled, "Digital Cellular Telecommunications System." In a conventional network, changing the network location of a network component typically requires that a user physically disconnect and then reconnect a link that connects the network component to the network.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 illustrates selected elements of exemplary network resource and association file 300.

FIG. 6 illustrates exemplary network configuration request 600.

DETAILED DESCRIPTION

Embodiments of the invention enable network components to change network location without a user having to physically disconnect and reconnect a link (e.g., a cable). The ability to programmatically change the network location of a network component enables, for example, a network component to be moved from one subnet to another "on the fly," thereby simplifying bandwidth management in realtime. Also, programmatically changing the network location of a network component is useful to test the mobility of mobile nodes in a network validation environment.

Figure 1:
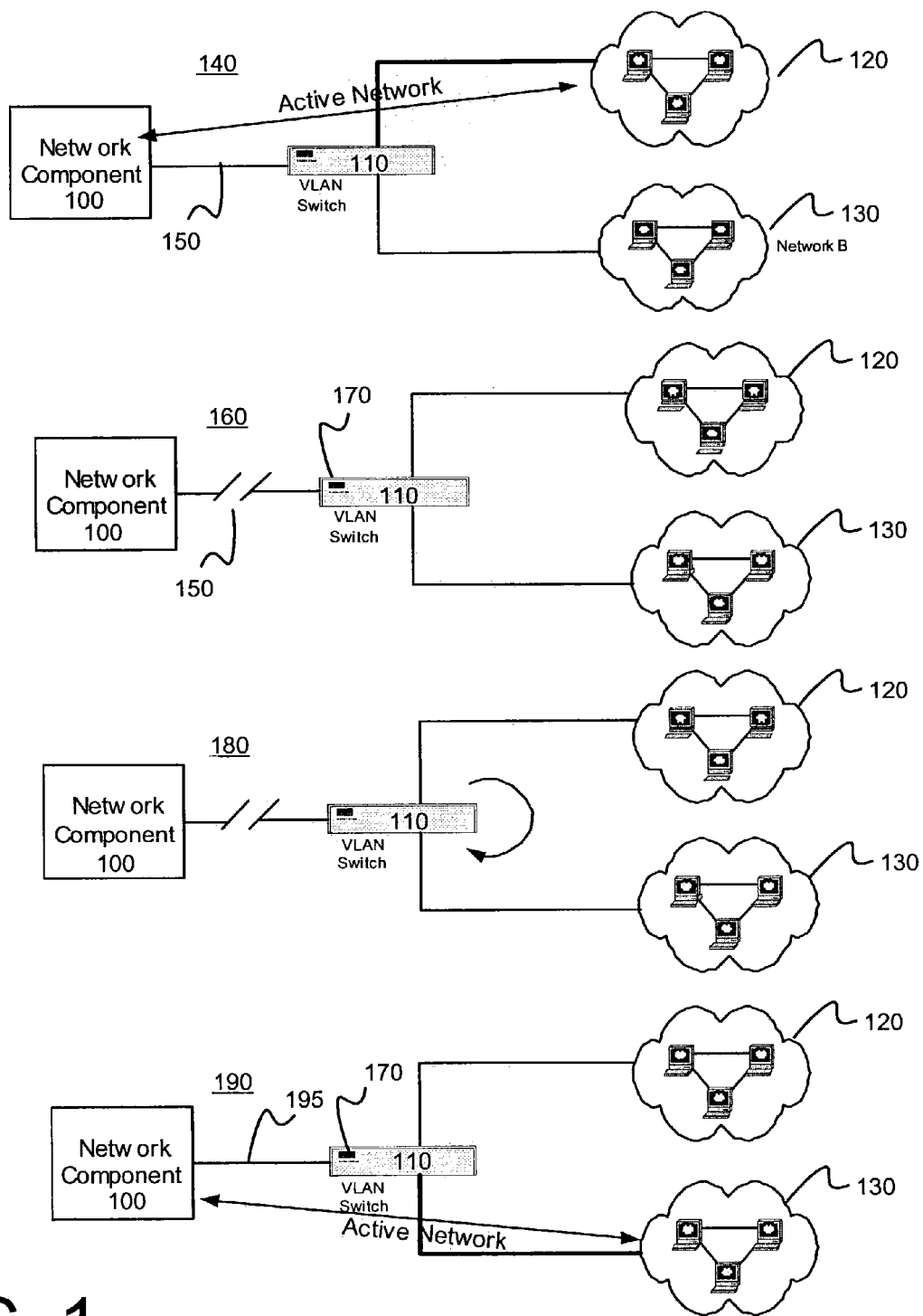
FIG. 1 is a block diagram that illustrates changing the network location of network component 100, according to an embodiment of the invention.

FIG. 1 is block diagram that illustrates changing the network location of network component 100, according to an embodiment of the invention. As shown in FIG. 1, network component 100 is selectively coupled with network 120 and network 130 through VLAN switch 110. A person of ordinary skill in the art will appreciate that a system for changing the network location of network component 100 may include more and/or different components than those shown in FIG. 1. It is not necessary, however, that all of these generally conventional components be shown in order to disclose an illustrative embodiment for practicing the invention.

Referring to reference numeral 140, network component 100 connects to VLAN switch 110 through link 150. Link 150 may be a wired link (e.g., a twisted pair wired connection or a coaxial connection) or a wireless link (e.g., via radio frequency or optical transmissions). VLAN switch 110 may provide a plurality of ports and may support a plurality of VLANs. In an embodiment of the invention, VLAN switch 110 connects network component 100 to network 120. The connection may be, for example, by associating network component 100 with a VLAN belonging to network 120.

Referring to reference numeral 160, link 150 is interrupted. Interrupting link 150 broadly refers to programmatically severing (at least temporarily) the link between network component 100 and network 120. In an embodiment of the invention, VLAN switch 110 includes switch 170. Switch 170 may be used to open and close link 150. The configuration of switch 170 may be stored in an electronic file. Programmatically interrupting link 150 refers to altering the electronic file to open or close switch 170, in an embodiment of the invention.

In alternative embodiments of the invention, an access point may provide link 150. In such embodiments, interrupting link 150 refers to, for example, deactivating the transmitter within the access point that provides link 150. Alternatively, interrupting link 150 may refer to merely modifying a signal transmitted from the access point to network component 100.

In some embodiments of the invention, a hub (not shown) connects network component 100 to VLAN switch 110. The hub's power may be controlled by another network component. In such embodiments of the invention, interrupting link 150 refers to powering down the hub that connects network component 100 to VLAN switch 110.

A confirmation signal refers to a signal sent over link 150 to confirm that link 150 is active (e.g., a heartbeat signal). If network component 100 does not detect the confirmation signal, it may determine that link 150 is interrupted. The characteristics of the confirmation signal may be controlled by an electronic file. In an embodiment of the invention, interrupting link 150 refers to programmatically configuring the confirmation signal provider to interrupt the confirmation signal. Configuring the confirmation signal broadly refers to, inter alia, programmatically setting, configuring, and/or reconfiguring the confirmation signal by interacting with the confirmation signal provider to alter its state. A person of ordinary skill in the art appreciates that the type of interaction used to alter the state of a network component depends on the particular network component.

Referring to reference numeral 180, the network to which network component 100 is connected is programmatically changed. Changing the network broadly refers to either connecting network component 100 with a different network or reconfiguring the network to which network component 100 was originally connected. Reconfiguring the network to which network component 100 was originally connected is further discussed below in regards to FIGS. 9 and 10. In the illustrated embodiment of the invention, VLAN switch 110 is configured to selectively connect network component 100 to either network 120 or network 130.

Configuring VLAN switch 110 broadly refers to programmatically associating network component 100 with a particular VLAN switch port and, thereby, associating network component 100 with a particular VLAN. The connections between VLAN switch ports and network components may be specified in an electronic file. In an embodiment of the invention, a software agent programmatically sets, configures, and/or reconfigures the VLAN switch by interacting with the VLAN switch to alter its state. A person of ordinary skill in the art appreciates that the type of interaction used to alter the state of a network component depends on the particular network component.

Referring to reference numeral 190, link 195 is established to provide a connection between network component 100 and network 130. In some embodiments of the invention, link 195 is the same link as link 150. In alternative embodiments of the invention, link 195 is a separate and independent link. For example, link 150 is a wired link (e.g., twisted pair of wires) and link 195 is a wireless link (e.g., via radio frequency transmissions), in an embodiment of the invention. In the illustrated embodiment of the invention, establishing link 195 includes closing switch 170. In an alternative embodiment of the invention, establishing link 195 refers to programmatically controlling a confirmation signal provider to establish the confirmation signal. A person of ordinary skill in the art appreciates that the type of interaction used to alter the state of a network component depends on the particular network component.

In yet other alternative embodiments of the invention, an access point may provide link 195. In such embodiments, establishing link 195 refers to, for example, activating the transmitter within the access point that provides link 195. Alternatively, establishing link 195 may refer to merely modifying a signal transmitted from the access point to network component 100.

In some embodiments of the invention, a hub (not shown) connects network component 100 to VLAN switch 110. The hub may have a power on/off switch that is programmatically configurable. In such embodiments of the invention, establishing link 195 refers to powering up the hub that connects network component 100 to VLAN switch 110.

Overview of the Functional Layers

Figure 2:
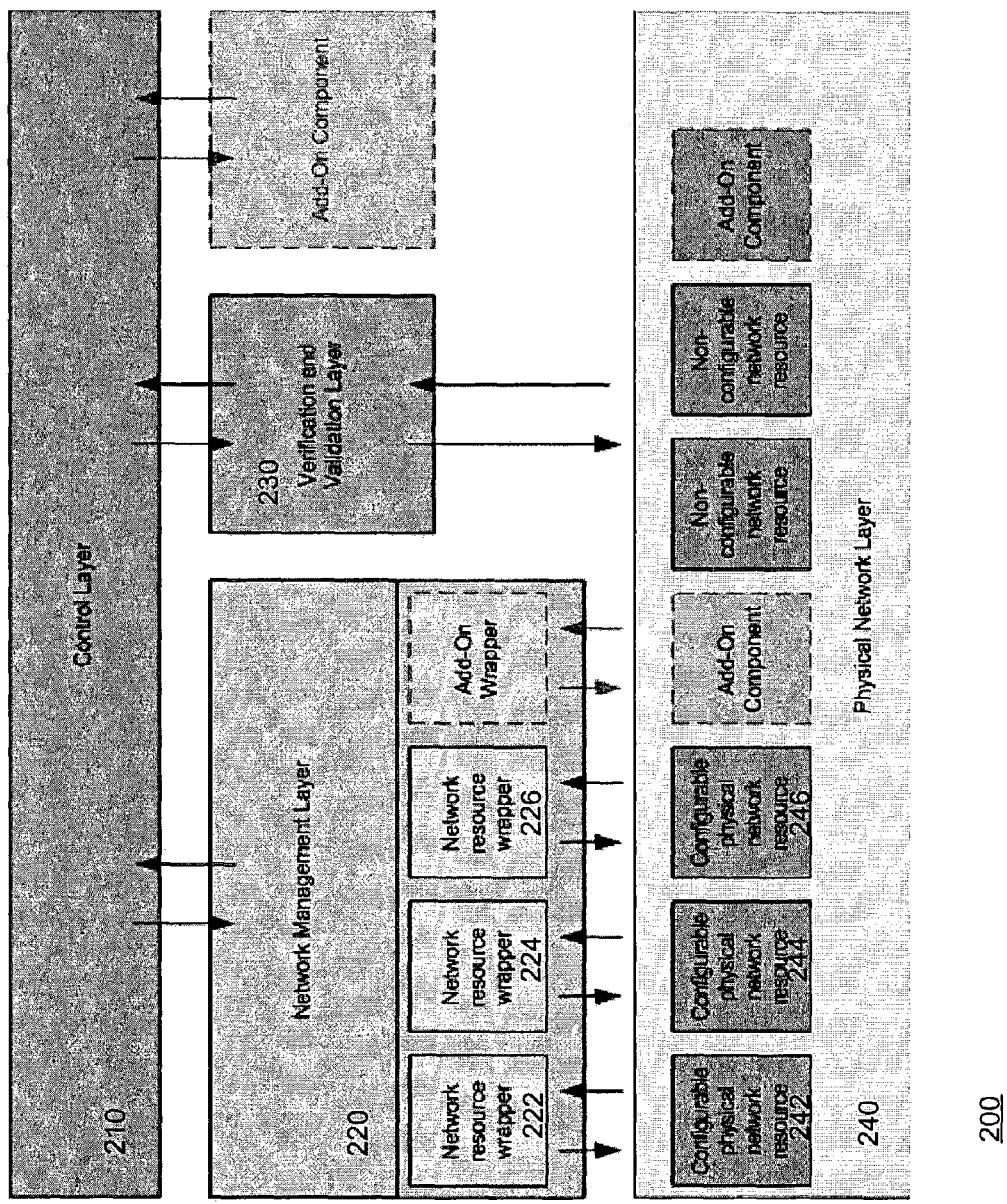
FIG. 2 is block diagram illustrating an embodiment of the invention abstracted into four layers.

To provide the above stated functions, embodiments of the invention may be abstracted into four layers: the control layer, the network management layer, the verification and validation layer, and the physical network layer. FIG. 2 is block diagram illustrating an embodiment of the invention abstracted into four layers. In alternative embodiments of the invention, the functions may be abstracted into more layers or fewer layers. FIG. 2 includes control layer 210, network management layer 220, verification and validation layer 230, and physical network layer 240.

Control layer 210 may provide a single control point for functions provided by embodiments of the invention. Control layer 210 may be accessed through a console directly on a node in close proximity to the network or through a remote login session (e.g., Telnet). The functions of control layer 210 include generating network scenarios and directing the other layers to configure and transition the network based on the generated network scenarios, in an embodiment of the invention. Network scenarios may be generated randomly or may be based on predefined network configurations, in an embodiment of the invention. Also, control layer 210 may generate a series of network scenarios back-to-back. Each series of network scenarios can be reproduced by supplying a seed logged in past scenarios, in an embodiment of the invention.

Control layer 210 determines the current physical layout and state of the network based on its interactions with network management layer 220 and verification and validation layer 230, in an embodiment of the invention. As will be further described below, control layer 210 accesses network management layer 220 to perform network configurations and network transitions. Transitioning a node broadly refers to, for example, transitioning a node from a first network interface to a second interface, and/or from a first subnet to a second subnet, and/or from a first Virtual Local Area Network (VLAN) to a second VLAN, and/or from a first topology to a second topology. The term network transition refers to transitioning one or more nodes within the network.

Network management layer 220 provides a number of functions including network configurations, network transitions, and maintenance of current network state information, in an embodiment of the invention. Network management layer 220 may be a stand-alone component for managing and reconfiguring network components. In alternative embodiments of the invention, network management layer 220 functions in association with the other layers illustrated in FIG. 2. In such an embodiment, the other layers may obtain network state information from network management layer 220.

FIG. 3 illustrates selected elements of exemplary network resource and association file 300. Network resource and association file 300 includes: dynamic network device section 302, non-dynamic network device section 304, power management device section 306, hubs section 308, Virtual Local Area Network (VLAN) switch section 310, router section 312, Dynamic Host Configuration Protocol (DHCP) server section 314, and addressing scheme section 316. A DHCP server refers to a network component that provides network administrative services in compliance with Request For Comments 2131 entitled, "Dynamic Host Configuration Protocol," R. Droms, March 1997. As illustrated in FIG. 3, network resource and association file 300 describes available network resources and associations in a standardized syntax. Related U.S. patent application Ser. No. <042390.P17061> further describes network resource and association files.

Network management layer 220, in an embodiment of the invention, is responsible for configuring networks and transitioning networks. As is further discussed below in regard to FIG. 5, network resource wrappers 222, 224, and 226 may be used to configure and transition networks. In addition, network management layer 220 may maintain IP address allocation for network components and generate a readable text file that reports each IP address to facilitate communication across the network. After each network configuration and/or transition, network management layer 220 may generate a snapshot of the current network state.

Figure 4:
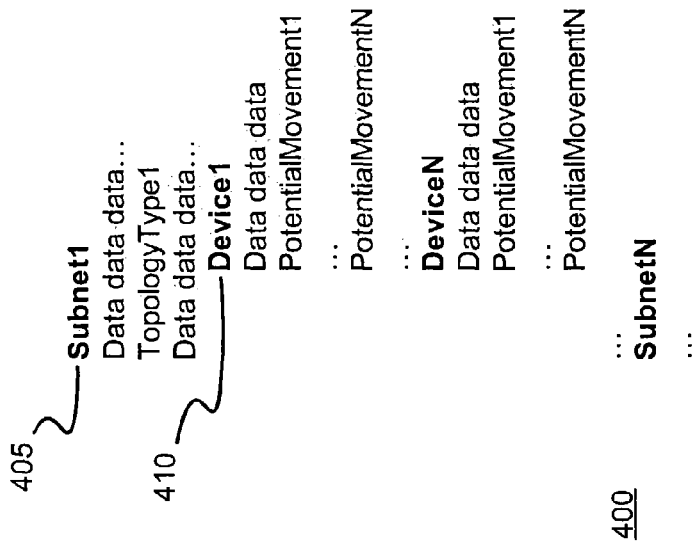
FIG. 4 is an illustration of an exemplary current network state snapshot 400.

FIG. 4 is an illustration of an exemplary current network state snapshot 400. The illustrated embodiment of current network state snapshot 400 is organized according to one or more subnets sections (e.g., subnet section 405). Each subnet section contains information about one or more network components within the subnet (e.g., node section 410). Node section 410 includes information about potential movement. Information about potential movement may include a list of network topologies based on network topologies and interfaces available to the node. For example, if a node contains an 802.11a network adaptor (and an 802.11a access point exists on the network), the node is able to make a transition to a wireless network connection. Network state snapshot 400 is more fully described in related U.S. patent application Ser. No. <042390.P17063>. An 802.11a network adaptor and an 802.11a access point respectively refer to a network adaptor and an access point that comply with the IEEE 802.11 standard, entitled "Wireless LAN Medium Access Control (MAC) and Physical Layer (PHY) Specifications, 1999 Edition."

After a network transition, multiple sections of network state snapshot 400 may be updated since some network transitions affect multiple network components. Network management layer 220 uses network resource wrappers to programmatically configure network components, in an embodiment of the invention. Network resource wrappers abstract the functionality of a network component in a standardized way that allows network components to be interchanged when the components provide the same (or similar) functionality, in an embodiment of the invention. The term programmatically broadly refers to action performed by a software, hardware, and/or firmware resource of one or more network components.

Figure 5:
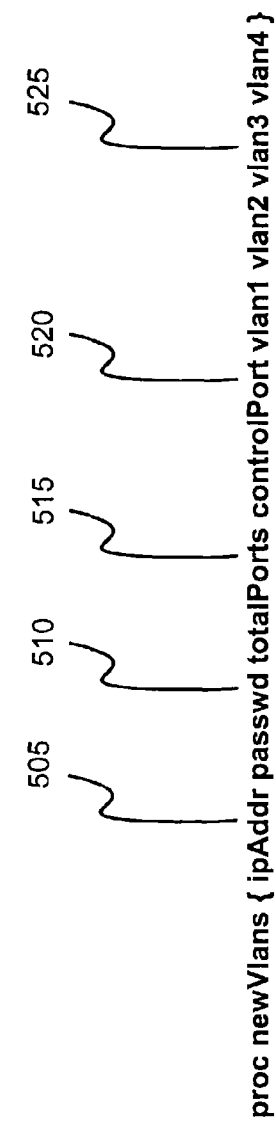
FIG. 5 is an exemplary illustration of network resource wrapper function call 500 with possible function parameters.

FIG. 5 is an exemplary illustration of network resource wrapper function call 500. Network resource wrapper function call 500 may be used, for example, to configure a VLAN switch. A person of ordinary skill in the art appreciates that similar network components may be configured with similar network resource wrappers. In an embodiment of the invention, there is a network resource wrapper corresponding to each configurable network component in a network. Table 1 provides a description of the fields of exemplary network resource wrapper function call 500.

TABLE 1

| Field | Description |
| --- | --- |
| IPAddr 515 | IPAddr 505 is the IP address from which the VLAN switch can be configured, in an embodiment of the invention. |
| Passwd 510 | Passwd 510 may be used to, for example, enable a Telnet session to the VLAN switch. |
| TotalPorts 515 | TotalPorts 515 represents the total number of ports on the VLAN switch. |
| ControlPort 520 | ControlPort 520 is the port from which the VLAN switch is being controlled, in an embodiment of the invention. |
| VLAN1, VLAN2, . . . , VLANn 525 | VLAN1, VLAN2, . . . , VLANn 525 provides one or more fields for representations of ports that are to be added to each VLAN. |

Referring again to FIG. 2, verification and validation layer 230 abstracts all devices that are used to verify and validate the current network configuration. These devices may include, for example, packet sniffers, traffic generators, and other network validation devices. In an embodiment of the invention, third party verification tools and/or proprietary tools can be added to this layer to provide seamless accessibility to a wide range of network analysis and traffic generation tools.

In an embodiment of the invention, the network validation devices are mobile. For example, during network scenario execution, network validation devices may be placed on the particular subnet that requires validation. In contrast, conventional network validation typically involves the manual movement of validation devices from one subnet to another, and/or one VLAN to another, and/or one network interface to another.

Control layer 210 interoperates with verification and validation layer 230 to perform graceful state recovery, in an embodiment of the invention. During the execution of a network scenario, verification and validation layer 230 detects and logs results to report to the control layer. Control layer 210 determines whether to perform graceful state recovery based on the errors, if any, logged and reported by the verification and validation layer. Graceful state recovery refers to reconfiguring network components to a state they were in before an error occurs during the execution of a network scenario.

Physical network layer 240 contains the physical network devices of network 200 (e.g., physical network resources 242, 244, and 246). In an embodiment of the invention, physical network resources 242, 244, and 246 correspond to network resource wrappers 222, 224, and 226 described above with respect to FIG. 5. Control layer 210 may request the functionality of physical network resources 242, 244, and 246 through a network configuration request.

FIG. 6 illustrates exemplary network configuration request 600. Network configuration request 600 includes subnet group section 605 and device section 610. Subnet group section 605 may be used to organize a plurality of subnet subsections (e.g., subnet subsection 615). Each subnet subsection may list information about the type of network topology requested for the subnet. For example, a particular subnet may include both wired and wireless network topology. Device section 610 may include information about nodes within a requested network configuration and a start position for mobile nodes within a requested network configuration. Network configuration requests are more fully described in related U.S. patent application Ser. No. <042390.P17063>.

In operation, control layer 210 may send a network configuration request to network management layer 220. Network management layer 220, in turn, may use network resource wrappers to programmatically configure the physical resources in physical network layer 240. When new physical resources are added to network 200, corresponding network wrappers may be written to network management layer 220 to abstract the functionality of the new resource. In an embodiment of the invention, non-configurable network resources may be added and/or removed from network 200 at will because network resource wrappers are not needed to interact with non-configurable network resources.

Interactions Among the Layers

Figure 7:
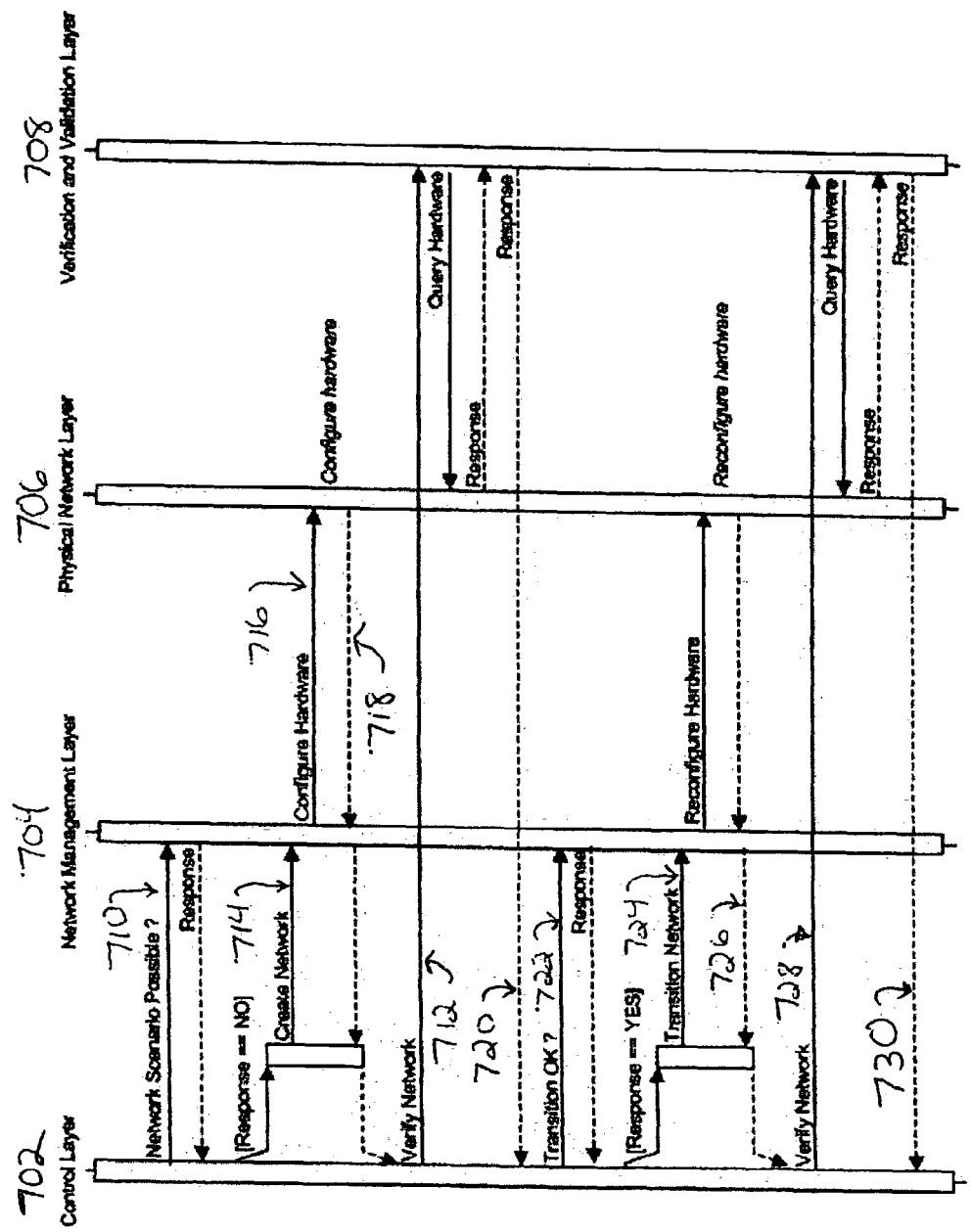
FIG. 7 is a conceptual illustration of selected interactions between abstract functional layers in network 700, according to an embodiment of the invention.

FIG. 7 is a conceptual illustration of selected interactions between abstract functional layers in network 700, according to an embodiment of the invention. Network 700 includes control layer 702, network management layer 704, physical network layer 706, and verification and validation layer 708. A person of ordinary skill in the art will appreciate that, in alternative embodiment embodiments of the invention, network 700 may include more layers or fewer layers.

A user may provide an input to initiate a network scenario, in an embodiment of the invention (not shown). Control layer 702 queries network management layer 704 to determine if executing the network scenario is possible given the current network configuration at 710. If the network scenario is supported in the current network configuration, control layer 702 initiates network verification and validation at 712.

Otherwise control layer 702 resolves the network scenario into a network configuration and creates a corresponding network configuration request at 714. The network configuration request may contain one or more subnets as well as the starting position on the network for mobile nodes. Network management layer 704 configures the network at 716 and reports success or failure of the configuration at 718. If network management layer 704 does not report any failures occurring during the configuration process, control layer 702 triggers the verification and validation layer 708 at 712. Verification and validation layer 708 performs network verification and/or validation tests and reports the findings to control layer 702 at 720.

A network scenario may include transitioning one or more nodes. For example, a network scenario may include transitioning a node from a wired LAN connection to a wireless LAN connection. Control layer 702 queries network management layer 704 to determine whether a transition is supported by the network configuration at 722. If the transition is supported then control layer 702 requests the transition at 724. Network management layer 704 reports success or failure of the transition at 726. If the transition is successful, control layer 702 prompts verification and validation layer 708 to perform appropriate tests at 728 and report the findings to control layer 702 at 730.

Embodiments of the invention may iterate the network configuration and transition processes to enable multiple network scenarios to occur one after another. Alternatively, the network scenario process may terminate after a single iteration. In such an embodiment, the findings of the completed network scenario may be reported to a user and a pseudo-random seed to reproduce the network scenario may be stored.

Figure 8:
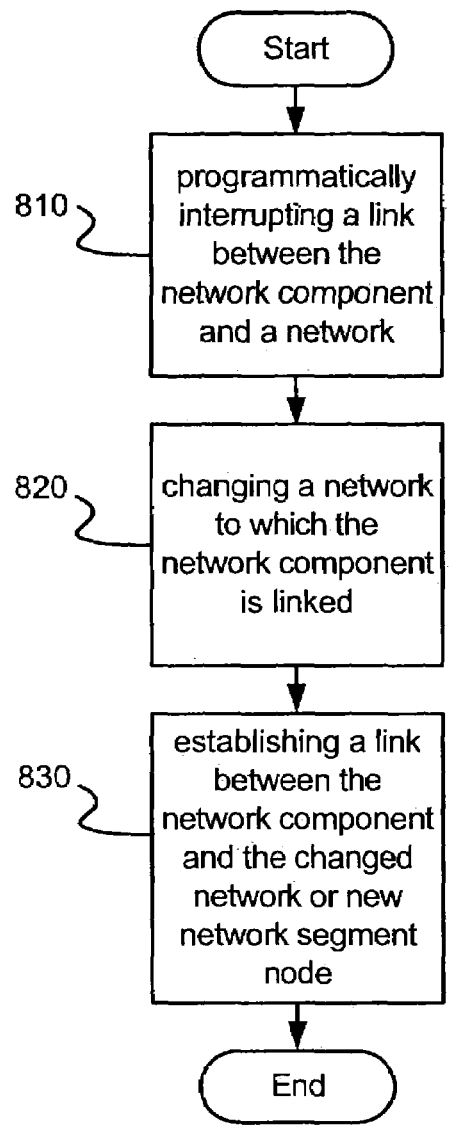
FIG. 8 is a flow diagram illustrating certain aspects of a method for programmatically changing the network location of a network component, according to an embodiment of the invention.
Figure 9:
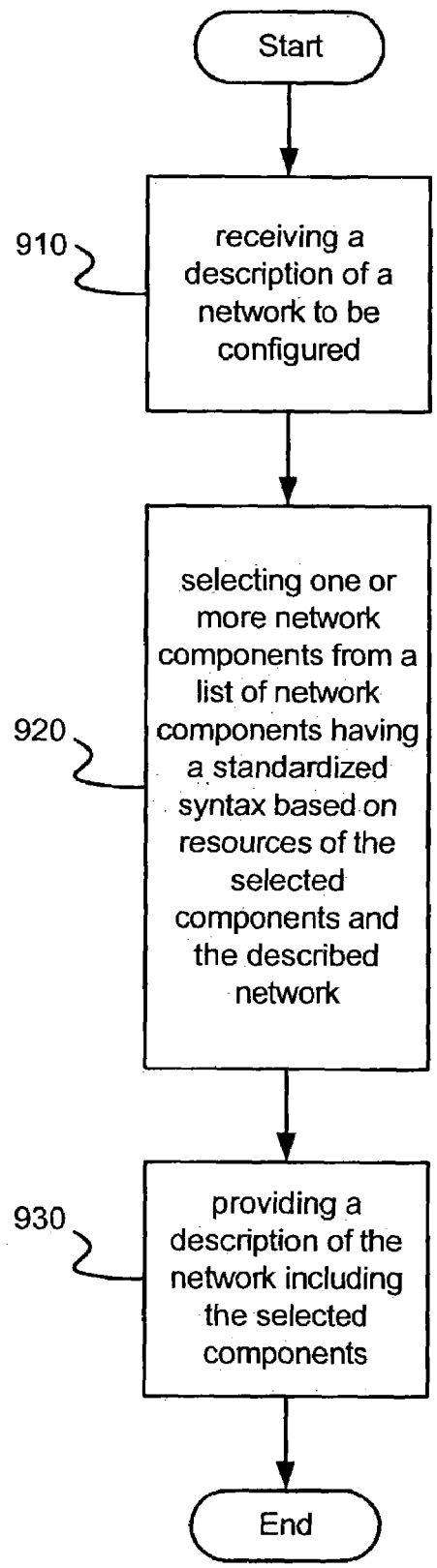
FIG. 9 is a flow diagram illustrating certain aspects of a method for automatically configuring a node according to an embodiment of the invention.
Figure 10:
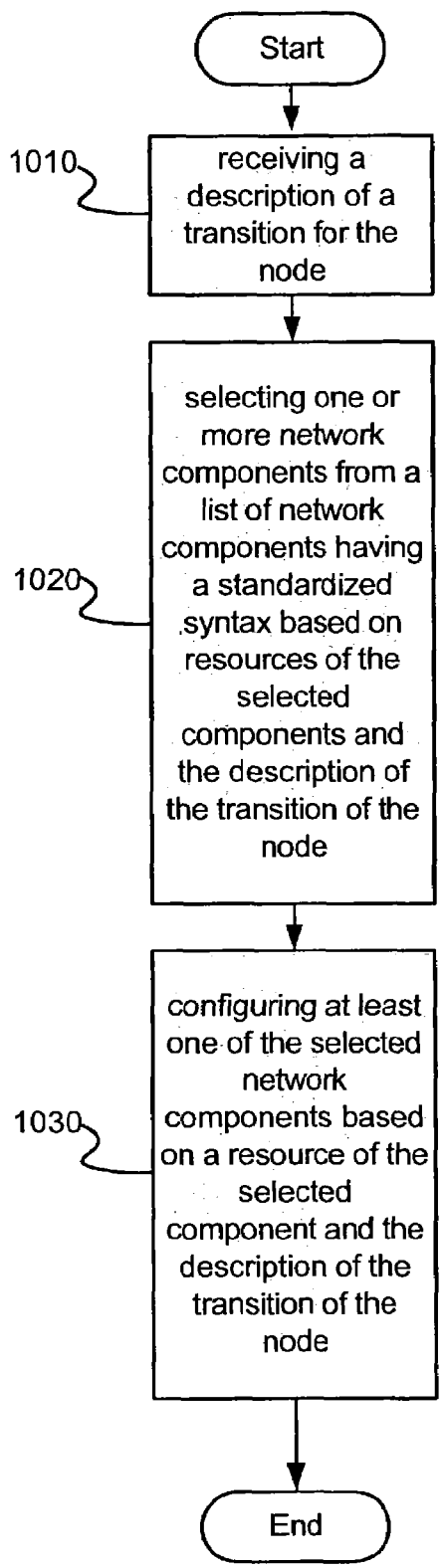
FIG. 10 is a flow diagram illustrating certain aspects of a method for automatically transitioning a node according to an embodiment of the invention.

Turning now to FIGS. 8 through 10, the particular methods associated with embodiments of the invention are described in terms of computer software and hardware with reference to a flowchart. The methods to be performed by a control layer and/or a management layer may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a network component) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, process, procedure, agent, application, etc.), as taking an action or causing a result. Such expressions are merely a shorthand way of saying that execution of the software by a computing device causes the device to perform an action or produce a result. For ease of discussion, the entities performing the functions of each layer are hereinafter referred to as agents.

For example, the entity (or entities) performing the functions of the management layer is referred to as the management agent. An agent may be executable content, control logic, firmware, or some combination thereof, in an embodiment of the invention.

FIG. 8 is a flow diagram illustrating certain aspects of a method for programmatically changing the network location of a network component. Referring to process block 810, a network management agent (not shown) interrupts a link between the network component and the network. In an embodiment of the invention, the network management agent resides on a Dynamic Host Configuration Protocol (DHCP) server. A DHCP server refers to a server that is compliant with Request for Comments 1541, "Dynamic Host Configuration Protocol," R. Droms, October 1993. In an alternative embodiment of the invention, the network management agent may reside on a control node. A person of ordinary skill in the art appreciates that the network management agent may reside on any of a number of different network components or may be distributed among a number of network components.

Interrupting the link may include interrupting a wired or a wireless link. In embodiments of the invention in which the link is wired, interrupting the link may include opening a switch that governs transmission over the link, interrupting a confirmation signal on the link, and/or powering down a hub that connects the network component to the network. In alternative embodiments of the invention in which the link is a wireless link, interrupting the link may include deactivating the transmitter of an access point that provides the wireless link.

Referring to process block 820, in an embodiment of the invention, the network management agent changes the network to which the network component was linked. Programmatically changing the network refers to either connecting the network component with a different network or configuring the network to which the network component was originally connected. Changing the configuration of the network is further described below with regard to FIG. 9 and FIG. 10.

Referring to process block 830, in an embodiment of the invention, the network management agent establishes a link between the network component and the changed network. Establishing the link may include establishing a wired and/or a wireless link. In some embodiments of the invention, the link established in process block 830 is the same as the link that was interrupted in process block 810. In alternative embodiments of the invention, a different link is established in process block 830. For example, in an embodiment of the invention, a wired link is interrupted in process block 810 and a wireless link is established in process block 830.

In embodiments of the invention in which the established link is wired, establishing the link may include closing a switch that governs transmission over the link, establishing a confirmation signal on the link, and/or powering up a hub that connects the network component to the network. In alternative embodiments of the invention in which the link is a wireless link, establishing the link may include activating the transmitter of an access point that provides the wireless link.

FIG. 9 is a flow diagram illustrating certain aspects of a method for automatically configuring a network according to an embodiment of the invention. Referring to process block 910, the network management agent (not shown) receives a description of a network to be configured. The received description of a network to be configured may be human-readable. The term human-readable refers to a description that when displayed on an output device (e.g., a monitor, printer, etc.) is understandable to a human reader. The received description may be randomly generated or it may be a predetermined description of a network to be configured. If the received description is predetermined, then it may be received from a database of predetermined network descriptions or the description may be provided by a user. In an embodiment of the invention, the received description has a standardized syntax. Network configuration request 600 shown in FIG. 6 is but one example of a received description of a network having a standardized syntax.

Referring to process block 920, in an embodiment of the invention, the network management agent selects one or more network components from a list of network components. The selection may be determined, at least in part, on whether the resources of the selected network component provide a resource requested in process block 910. For example, in an embodiment of the invention, the network management agent references a list of network components (e.g., network resource and association file 300, shown in FIG. 3). The network management agent may then populate a virtual map (e.g., in memory) to correspond to the network to be configured from the referenced list of network components, based on the received description of a network to be configured.

Referring to process block 930, in an embodiment of the invention, the network management creates a snapshot file of the configured network. The snapshot file, however, includes the one or more selected network components, in an embodiment of the invention. The description provided in process 930 is a snapshot of the configured network including the selected network elements, in an embodiment of the invention (e.g., current network state snapshot 400, shown in FIG. 4).

FIG. 10 is a flow diagram illustrating certain aspects of a method for automatically transitioning a node, according to an embodiment of the invention. Referring to process block 1010, a network management agent receives a description of a transition for the node. Transitioning a node broadly refers to, for example, transitioning a node from a first network interface to a second interface, and/or from a first subnet to a second subnet, and/or from a first VLAN to a second VLAN, and/or from a first topology to a second topology.

In an embodiment of the invention, the received description has a standardized syntax (e.g., the syntax illustrated in FIG. 6). The received description may be human-readable when displayed on an output device (e.g., a display screen or a printer). The received description may be generated in a number of different ways. For example, the received description may be randomly generated in the control layer and passed to a function in the network management layer to initiate the transition. Also, the received description may be provided by a user (e.g., a system administrator) who wants to implement a specified node transition.

Transitioning a node typically requires configuring the resources of one or more network components. Referring to process block 1020, the network management agent selects a network component, from a list of network components, to support the node transition described in process block 1010. In an embodiment of the invention, the list of network components has a standardized syntax (e.g., network resource and association file 300, shown in FIG. 3). The determination of which network components to select may be specified by the control layer (and/or a user) in a function call.

In an embodiment of the invention, selecting a network element may include referencing the list of network components to identify resources that are available within a network. The network management agent may create a virtual map of an existing network based on the referenced list of network components. The network management agent may then compare the received description of the node transition with the virtual map of the existing network and select appropriate resources to support the node transition (e.g., a VLAN switch, and/or an access point, and/or a power on/off module). In an embodiment of the invention, the network management agent then populates another virtual map that corresponds to the network after the node transition with the selected resources.

Referring to process block 1030, the selected network components are configured to support the described node transition. The configuration of the selected network components may be based on resources of the selected network component and the received description of the node transition. For example, configuring a router may include associating a network interface of the router with the node to be transitioned. Similarly, configuring a VLAN switch may include associating the node to be transitioned with a VLAN of the VLAN switch.

Referring to process block 1030, a VLAN switch is configured, in an embodiment of the invention. Configuring a VLAN switch broadly refers to associating one or more VLAN switch ports with a particular VLAN (in effect associating every network component connected to the ports with a particular VLAN). The connections between VLAN switch ports and network components may be specified in an electronic file. In an embodiment of the invention, a software agent programmatically sets, configures, and/or reconfigures the VLAN switch by interacting with the VLAN switch to alter its state. A person of ordinary skill in the art appreciates that the type of interaction used to alter the state of a network component depends on the particular network component.

In an embodiment of the invention, a router is configured at process block 1030. A router may provide a number of network interfaces, in an embodiment of the invention. Each network interface may be associated with IP address information (e.g., interface IP address and subnet) to enable the exchange of packets with the interface. The IP address information for each interface may be specified by an electronic file(s). Configuring the router broadly refers to, inter alia, programmatically setting, configuring, and/or reconfiguring the one or more network interfaces of the router by interacting with router to alter its state. A person of ordinary skill in the art appreciates that the type of interaction used to alter the state of a network component depends on the particular network component.

A DHCP server may be configured at process block 1030. In an embodiment of the invention, a DHCP server provides network administrative functions (e.g., providing IP address information to nodes within the network). The DHCP server may associate one or more network interfaces with corresponding IP address information (e.g., IP address, subnet mask, and gateway). The associations between network interfaces and corresponding IP address information determine which nodes receive which network administrative functions. In an embodiment of the invention, the associations between network interfaces and corresponding IP address information is contained in an electronic file. Configuring the DHCP server broadly refers to, inter alia, programmatically setting, configuring, and/or reconfiguring the DHCP server by interacting with the DHCP server to alter its state. A person of ordinary skill in the art appreciates that the type of interaction used to alter the state of a network component depends on the particular network component.

Referring again to process block 1030, a power on/off module may be configured. In an embodiment of the invention, power on/off modules may be associated with network components (e.g., hubs and access points). Configuring the power on/off modules broadly refers to, inter alia, programmatically powering on or off the power on/off modules by interacting with the power on/off modules to alter their state. A person of ordinary skill in the art appreciates that the type of interaction used to alter the state of a network component depends on the particular network component.

Figure 11:
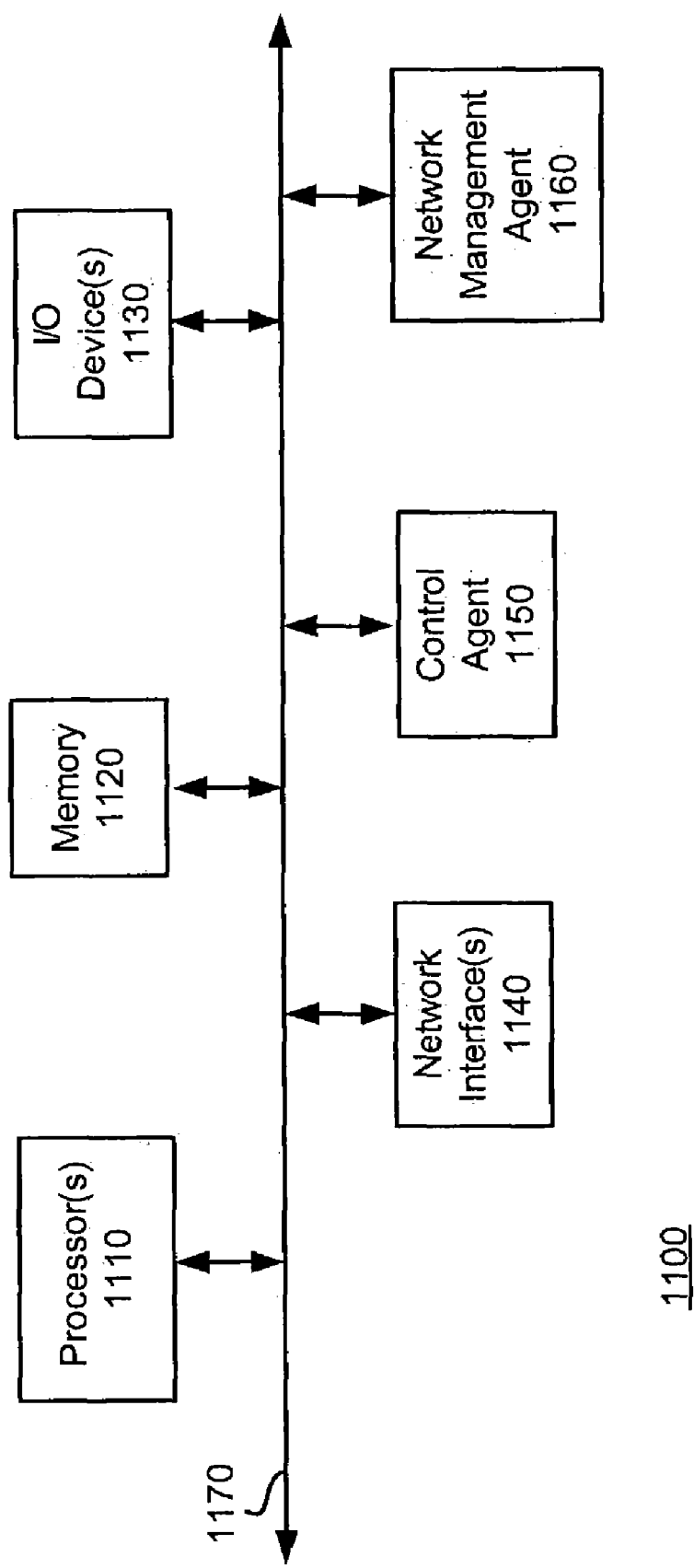
FIG. 11 is a simplified block diagram of selected elements of exemplary node 1100, implemented according to an embodiment of the invention.

FIG. 11 is a simplified block diagram of selected elements of exemplary node 1100, implemented according to an embodiment of the invention. Node 1100 may include: one or more processor(s) 1110, memory 1120, one or more Input/Output interfaces 1130, network interface(s) 1140, control agent 1150, management agent 1160. The illustrated elements may be connected together through system interconnect 1170. Processor(s) 1110 may include a microprocessor, microcontroller, field programmable gate array (FPGA), application specific integrated circuit (ASIC), central processing unit (CPU), programmable logic device (PLD), and similar devices that access instructions from system storage (e.g., memory 1120), decode them, and execute those instructions by performing arithmetic and logical operations. In some embodiments of the invention, processor(s) 1120 is implemented with a plurality of processors.

Memory 1120 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1120 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1120 may store program modules such as routines, programs, objects, images, data structures, program data, and other program modules that perform particular tasks or implement particular abstract data types that facilitate system use.

One or more I/O interfaces 1130 may include a hard disk drive interface, a magnetic disk drive interface, an optical drive interface, a parallel port, serial controller or super I/O controller, serial port, universal serial bus (USB) port, a display device interface (e.g., video adapter), a sound card, modem, and the like.

Network interface(s) 1140 may include a wide variety of software, hardware, and/or firmware to interface node 1100 with an associated network (not shown). In an embodiment of the invention, network interface 1140 includes both wired (e.g., local area network) interfaces and wireless (e.g., wireless local area network) interfaces. Network interface(s) 1140 may include network interface card(s) and/or chipsets that provide a network interface.

Control agent 1150 enables node 1100 to act as a single control point for a network to which node 1100 is connected. Control agent 1150 may be executable content, control logic (e.g., ASIC, PLD, FPGA, etc.), firmware, or some combination thereof, in an embodiment of the invention. In embodiments of the invention in which control agent 1150 is executable content, it may be stored in memory 1120 and executed by processor(s) 1110.

Management agent 1160 enables node 1100 to perform network configuration changes and network transitions, in an embodiment of the invention. Management agent 1160 may be executable content, control logic (e.g., ASIC, PLD, FPGA, etc.), firmware, or some combination thereof, in an embodiment of the invention. In embodiments of the invention in which management agent 1160 is executable content, it may be stored in memory 1120 and executed by processor(s) 1110. In the illustrated embodiment of the invention, management agent 1160 resides on the same node as control agent 1150. In alternative embodiments of the invention, control agent 1150 and management agent 1160 reside on separate nodes. In yet other alternative embodiments of the invention, control agent 1150 and/or management agent 1160 are distributed across more than one node.

System interconnect 1170 permits communication between the various elements of node 1170. System interconnect 1170 may include a wide variety of signal lines including one or more of a memory bus, peripheral bus, local bus, host bus, bridge, optical, electrical, acoustical, and other propagated signal lines.

Figure 12:
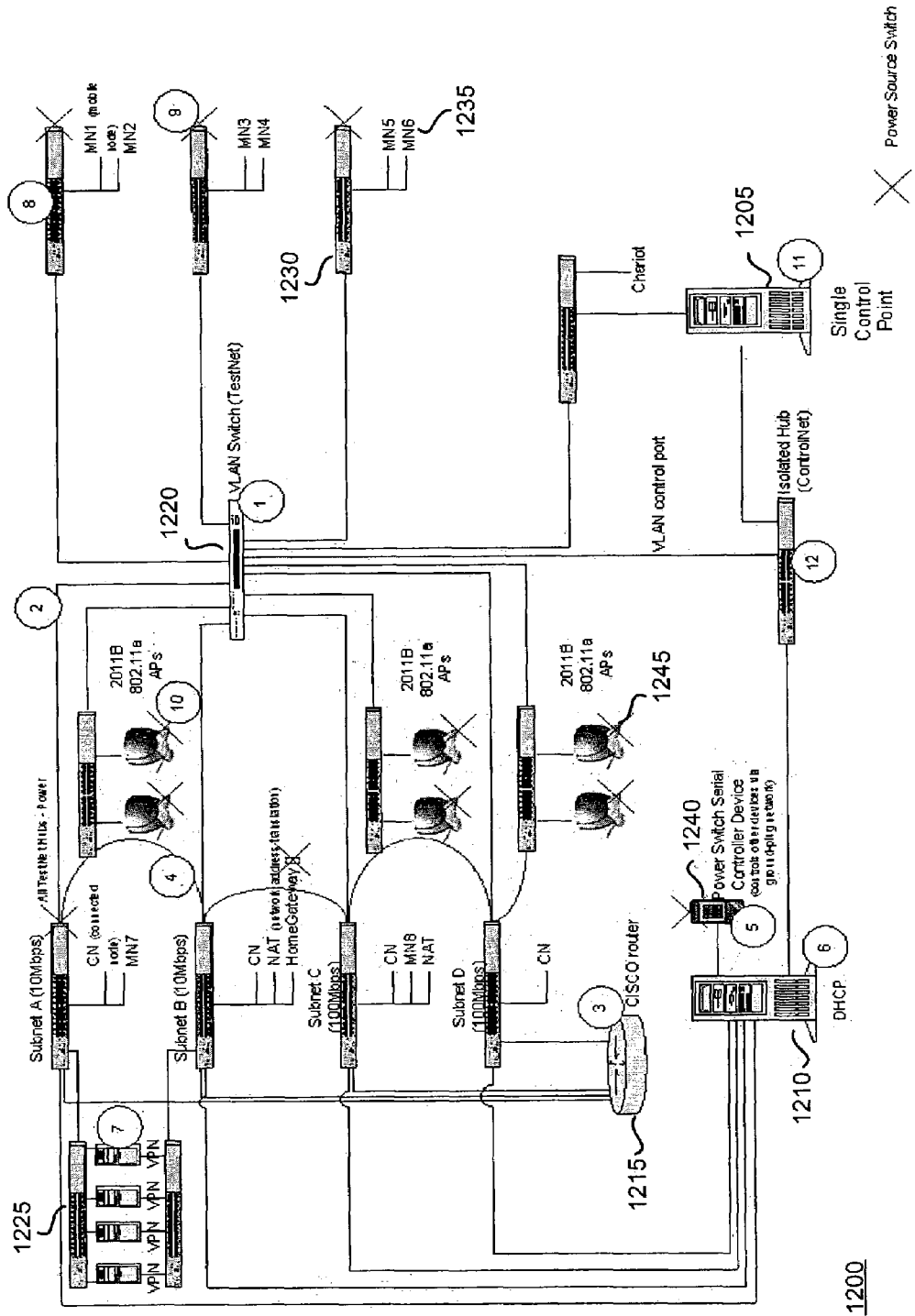
FIG. 12 is a block diagram of selected elements of exemplary network 1200, implemented according to an embodiment of the invention.

FIG. 12 is a block diagram of selected elements of exemplary network 1200, implemented according to an embodiment of the invention. Network 1200 includes control node 1205, DHCP server 1210, router 1215, VLAN switch 1220, Virtual Private Network (VPN) 1225, hub 1230, and node 1235, power switch serial controller device 1240, and access point 1245.

Control node 1205 provides a single control point for executing network configurations, network transitions, and/or network scenarios, in an embodiment of the invention. A control agent (e.g., control agent 1150) resides on control node 1205 in an embodiment of the invention. In alternative embodiments of the invention, a control agent and a management agent (e.g., management agent 1140) reside on control node 1205. Control node 1205 may be a general purpose computing device containing a control agent, in an embodiment of the invention.

DHCP server 1210 provides network administrative functions in an embodiment of the invention. For example, DHCP server 1210 may provide IP addresses, subnet masks, and/or gateway information to network components of network 1200. The DHCP server may associate one or more network interfaces with corresponding IP address information (e.g., IP address, subnet mask, and gateway). The associations between network interfaces and corresponding IP address information determine which nodes receive which network administrative functions, in an embodiment of the invention. DHCP serves are well known to those of ordinary skill in the art and will not be further described except as to how they relate to embodiments of the invention. In an embodiment of the invention a network management agent resides on DHCP server 1210. In such an embodiment of the invention, DHCP server 1210 may be referred to as a management node. The term management node broadly refers to a node on which a management agent (or a portion of a management agent) resides.

Router 1215 provides a number of network interfaces in an embodiment of the invention. Each network interface may be associated with IP address information (e.g., interface IP address and subnet) to enable the exchange of packets with the interface. Routers are well known to those of ordinary skill in the art and will not further described except as to how they relate to embodiments of the invention.

VLAN switch 1220 provides a plurality of ports and supports a plurality of VLANs, in an embodiment of the invention. Each supported VLAN may include one or more ports. Each port may be connected to one or more network components. VLAN switch 1220 enables an embodiment of the invention to group hubs together programmatically into logical subnets. VLAN switches are well known to those of ordinary skill in the art and will not be further described except as to how they relate to embodiments of the invention.

VPN 1225 provides a mechanism for secure transactions in an embodiment of the invention. In some embodiments of the invention, one or VPNs employ static IP address configures. In such embodiments of the invention, a network management agent may create the specific subnets used to communicate with the statically configured VPN. This may be accomplished, for example, by configuring the IP addresses on the DHCP server with the subnet IP addresses that correspond to the specific VPN. In addition, router 1215 may be configured to isolate network traffic on either side of the VPN so that only VPN traffic is routed. Internal traffic refers to traffic within the VPN (or firewall) and external traffic refers to traffic outside of the VPN (or firewall). VPNs are well known to those of ordinary skill in the art and will not be further described except as to how they relate to embodiments of the invention.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method of changing a network location of a network component comprising:

programmatically interrupting a link between the network component and a network, wherein the network component is associated with a network resource wrapper, the network resource wrapper to provide a machine accessible and standardized description of the network component;

changing the network to which the network component is linked, wherein the network includes a plurality of network components, at least some of the network components having an associated network resource wrapper, each network resource wrapper to provide a machine accessible and standardized description of one or more functions of an associated network component, wherein the associated network component is capable of being configured by a network resource wrapper function call from a network management agent, and further wherein changing the network includes programmatically altering at least one of the network resource wrappers to configure at least one network component; and establishing a link between the network component and the changed network.

2. The method of claim 1, wherein programmatically interrupting the link between the network component and the network comprises:

powering down a hub that connects the network component to the network.

3. The method of claim 1, wherein programmatically interrupting the link between the network component and the network comprises:

interrupting a confirmation signal from a cable that connects the network component to the network.

4. The method of claim 1, wherein programmatically interrupting the link between the network component and the network comprises:

deactivating a transmitter in an access point that connects the network component to the network.

5. The method of claim 1, wherein programmatically interrupting the link between the network component and the network comprises:

opening a switch that connects the network component to the network.

6. The method of claim 1, wherein changing the network to which the network component is linked comprises:

programmatically disassociating the network component from a first network; and programmatically associating the network component with a second network.

7. The method of claim 1, wherein changing the network to which the network component is linked comprises:

programmatically reconfiguring the network.

8. The method of claim 7, wherein programmatically reconfiguring the network comprises:

programmatically configuring a Virtual Local Area Network (VLAN) switch to include the network component in a VLAN of the VLAN switch.

9. The method of claim 7, wherein programmatically reconfiguring the network comprises:

programmatically configuring a router to associate a network interface with the network component.

10. The method of claim 7, wherein programmatically reconfiguring the network comprises:

programmatically configuring a Dynamic Host Configuration Protocol (DHCP) server to associate a network interface with Internet Protocol (IP) address information.

11. The method of claim 7, wherein programmatically reconfiguring the network comprises:

programmatically configuring a power on/off module to an associated network component.

12. The method of claim 1, wherein establishing the link between the network component and the changed network comprises:

powering up a hub that connects the network component to the network.

13. The method of claim 1, wherein establishing the link between the network component and the changed network comprises:

providing a confirmation signal to a cable that connects the network component to the network.

14. The method of claim 1, wherein establishing the link between the network component and the changed network comprises:

activating a transmitter in an access point that connects the network component to the network.

15. The method of claim 1, wherein establishing the link between the network component and the changed network comprises:

closing a switch that connects the network component to the network.

16. A system comprising:

a network component to connect with a network wherein the network component is associated with a network resource wrapper, the network resource wrapper to provide a machine accessible and standardized description of the network component; and a node to change the location of the network component, the node having a processor and logic executable thereon to interrupt a link between the network component and the network;

change the network to which the network component is linked, wherein the network includes a plurality of network components, at least some of the network components having an associated network resource wrapper, each network resource wrapper to provide a machine accessible and standardized description of one or more functions of an associated network component, wherein the associated network component is capable of being configured by a network resource wrapper function call from a network management agent, and further wherein changing the network includes programmatically altering at least one of the network resource wrappers to configure at least one network component; and establish a link between the network component and the changed network.

17. The system of claim 16, further comprising:

a hub to provide the link between the network component and the network; and wherein the node having the processor and logic executable thereon to interrupt the link between the network component and the network comprises the node having logic executable thereon to power down the hub that provides the link between the network component and the network.

18. The system of claim 16, further comprising:

an access point to provide the link between the network component and the network; and wherein the node having the processor and logic executable thereon to interrupt the link between the network component and the network comprises the node having logic executable thereon to deactivate the access point that provides the link between the network component and the network.

19. The system of claim 16, wherein the node having a processor and logic executable thereon to change the network to which the network component is linked comprises the node having logic executable thereon to:

programmatically disassociate the network component from a first network; and programmatically associate the network component with a second network.

20. The system of claim 16, wherein the node having a processor and logic executable thereon to change the network to which the network component is linked comprises the node having logic executable thereon to:

programmatically reconfigure the network.

21. The system of claim 20, wherein the node having a processor and logic executable thereon to programmatically reconfigure the network comprises the node having logic executable thereon to:

programmatically configure a Virtual Local Area Network (VLAN) switch to include the network component in a VLAN of the VLAN switch.

22. An article of manufacture comprising:

an electronically accessible medium providing instructions that, when executed by an apparatus, cause the apparatus to interrupt a link between the network component and a network, wherein the network component is associated with a network resource wrapper, the network resource wrapper to provide a machine accessible and standardized description of the network component;

change a network to which the network component is linked, wherein the network includes a plurality of network components, at least some of the network components having an associated network resource wrapper, each network resource wrapper to provide a machine accessible and standardized description of one or more functions of an associated network component, wherein the associated network component is capable of being configured by a network resource wrapper function call from a network management agent, and further wherein changing the network includes programmatically altering at least one of the network resource wrappers to configure at least one network component; and establish a link between the network component and the changed network.

23. The article of manufacture of claim 22, wherein the electronically accessible medium providing instructions that, when executed by an apparatus, cause the apparatus to interrupt the link between the network component and the network cause the apparatus to:

power down a hub that connects the network component to the network.

24. The article of manufacture of claim 22, wherein the electronically accessible medium providing instructions that, when executed by an apparatus, cause the apparatus to interrupt the link between the network component and the network cause the apparatus to:

deactivate a transmitter in an access point that connects the network component to the network.

25. The article of manufacture of claim 22, wherein the electronically accessible medium providing instructions that, when executed by an apparatus, cause the apparatus to change the network to which the network component is linked cause the apparatus to:

programmatically disassociate the network component from a first network; and programmatically associate the network component with a second network.

26. The article of manufacture of claim 22, wherein the electronically accessible medium providing instructions that, when executed by an apparatus, cause the apparatus to change the network to which the network component is linked cause the apparatus to:

programmatically reconfigure the network.

27. The article of manufacture of claim 26, wherein the electronically accessible medium providing instructions that, when executed by an apparatus, cause the apparatus to programmatically reconfigure the network cause the apparatus to:

programmatically configure a Virtual Local Area Network (VLAN) switch to include the network component in a VLAN of the VLAN switch.

* * * * *